March 20, 1956 — D. E. PLUMB — 2,739,253
PERMANENT MAGNET ROTOR
Filed Jan. 30, 1953

WITNESSES:
John E. Healy
Wm. B. Sellers

INVENTOR
Donald E. Plumb.
BY F. P. Lyle
ATTORNEY

United States Patent Office 2,739,253
Patented Mar. 20, 1956

2,739,253

PERMANENT MAGNET ROTOR

Donald E. Plumb, Williamsville, N. Y., assignor to Westinghouse Electric Corporation, East Pittsburgh, Pa., a corporation of Pennsylvania Application January 30, 1953, Serial No. 334,290

2 Claims. (Cl. 310—156)

The present invention relates to rotor members for dynamo-electric machines, and more particularly, to a permanent magnet rotor of simple and inexpensive construction.

Alternating current generators with permanent magnet rotors are being used to an increasing extent as exciters to supply excitation to the field winding of a main alternating current generator, the output current of the alternating current exciter being rectified and supplied to the field of the main generator through a saturable reactor or magnetic amplifier, which is used to control the field current. In such excitation systems, the frequency of the alternating current exciter is preferably relatively high, since the magnetic amplifier can be made smaller and lighter in a high-frequency system, and this means that the exciter must have a rotor with a large number of poles, although its physical size is relatively small. In the conventional construction of permanent magnet rotors, the permanent magnets and pole shoes are individually secured to the shaft, or to a support member, by means of bolts or screws, or other individual securing means, and a suitable system of damper windings must also be provided, one usual system consisting of a number of bars equal to the number of poles and an end ring at each end of the rotor. Thus, in the conventional construction of high-frequency permanent magnet rotors, a large number of parts are required which are relatively small and which are individually assembled and secured to the support and to each other, thus involving a complicated structure and a difficult and expensive assembly operation.

The principal object of the present invention is to provide a permanent magnet rotor for dynamo-electric machines which is of simple and inexpensive construction.

Another object of the invention is to provide a permanent magnet rotor which can be easily and inexpensively manufactured by means of standard tools and manufacturing methods such as are used in the production of conventional squirrel-cage rotors.

A further object of the invention is to provide a permanent magnet rotor in which the magnets and pole shoes are held in place by a cage structure which can be die-cast in place and which rigidly holds the magnets and pole shoes and also serves as a damper winding.

Other objects and advantages of the invention will be apparent from the following detailed description, taken in connection with the accompanying drawing, in which.

Figure 1:
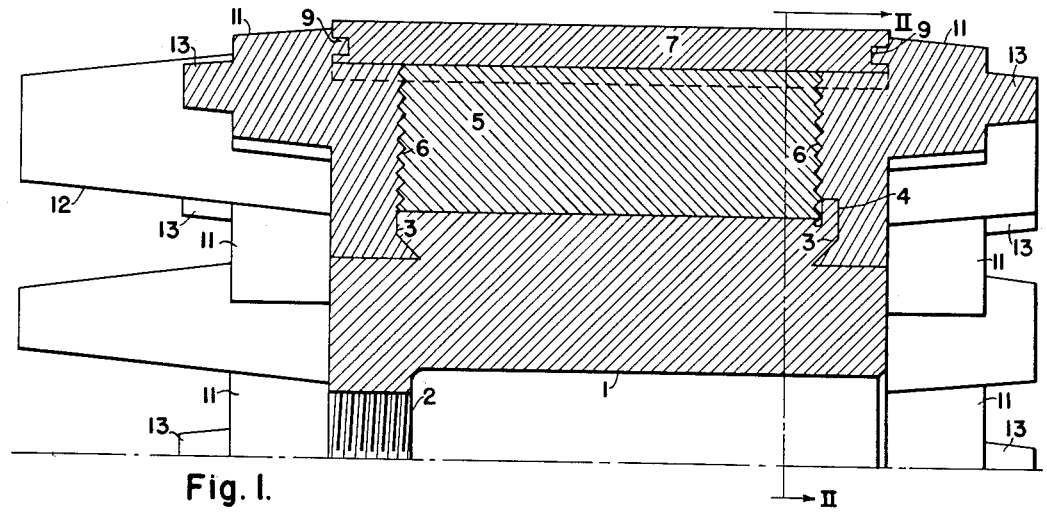
Figure 1 is a longitudinal sectional view of a rotor embodying the invention.

The invention is shown in the drawing embodied in a permanent magnet rotor having twelve poles, for use in a high-frequency alternating current exciter, although it will be apparent that the invention is applicable to rotors having any number of poles and intended for use in any type of dynamo-electric machine. The rotor is shown as including a quill shaft 1, which may be made of steel or other suitable material, and which may be internally threaded at one end, as indicated at 2, for mounting on a shaft. The quill 1 serves as a support member for the poles of the rotor, and it will be evident that the poles might be supported directly on a solid shaft, if desired, or on a spider or support member of any other suitable type. The quill shaft 1 has an undercut shoulder 3 at each end and a radial flange 4 may be provided at one end to facilitate proper alignment of the magnets and quill during the die-casting operation.

Figure 2:
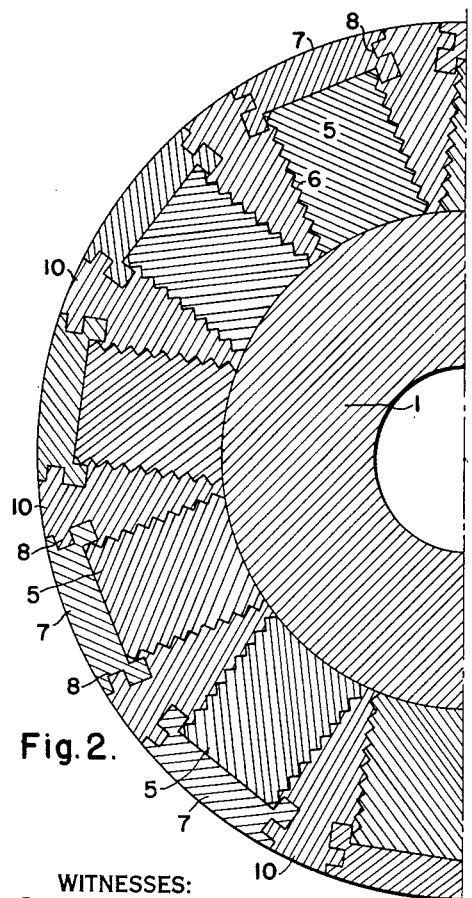
Fig. 2 is a transverse sectional view approximately on the line II—II of Fig. 1.
Figure 3:
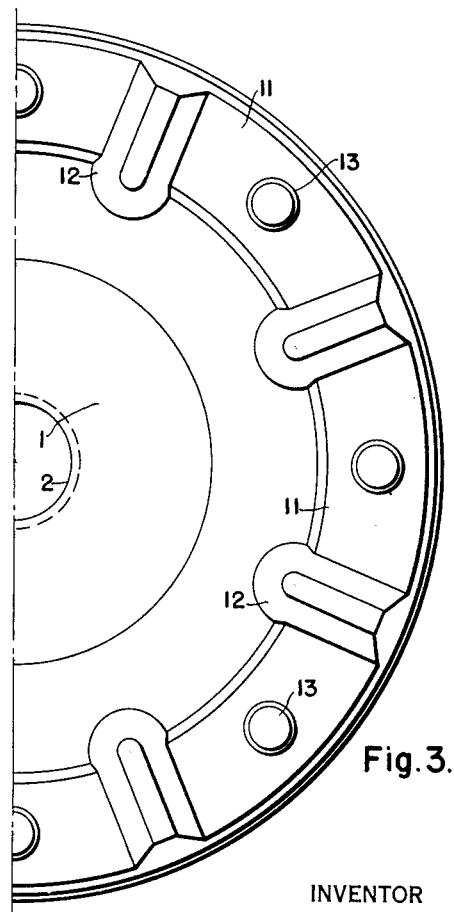
Fig. 3 is an end view of the motor.

The poles of the rotor are formed by a plurality of permanent magnets 5 disposed radially about the quill shaft 1. The magnets 5 may be made of any suitable permanent magnet alloy and are magnetized after assembly to provide magnetic poles of alternate polarity. The magnets 5 extend longitudinally of the quill 1 and are provided with longitudinal grooves or serrations 6 on both sides and on both ends. A pole shoe 7 is provided for each of the permanent magnets 5. The pole shoes 7 may be made of any suitable material having the required magnetic properties, and they extend longitudinally and preferably extend beyond the permanent magnets 5 at each end as shown in Fig. 1. The outer surfaces of the pole shoes 7 are arcuate and the inner surfaces conform to the outer surfaces of the permanent magnets 5, with the sides of the pole shoes preferably overlapping the magnets, so that the pole shoes 7 fit on the magnets as shown in Fig. 2. Each of the pole shoes 7 has a longitudinal groove 8 in each side and a similar groove 9 in each end.

In assembling the rotor, the magnets 5 and pole shoes 7 are placed in position on the quill 1 with the ends of the magnets seating against the flange 4 to position them. The magnets and pole shoes are firmly clamped in place in a die mold, which may be similar to the molds used in the production of conventional die-cast squirrel-cage rotors, and which applies considerable radial clamping pressure. A cage structure is then die-cast in place, using aluminum or an aluminum alloy, or any other conductive material capable of being die-cast and having the desired electrical resistivity. The cage structure consists of longitudinal members 10 extending longitudinally between the magnets 6, and substantially completely filling the spaces between the magnets and pole shoes, and end rings 11 at each end which extend circumferentially of the rotor and are integrally joined to the longitudinal members 10. It will be seen that by die-casting the cage structure, the metal is caused to flow into the grooves 6, 8 and 9 of the magnets and pole shoes, and into the undercut portions of the shoulders 3, so that the magnets and pole shoes are engaged by the cage structure and rigidly held in place. If desired, fan blades 12 and balancing lugs 13 may be formed integral with the end rings in the usual manner at one or both ends of the rotor.

It will be evident that a construction has been provided for permanent magnet rotors which makes it possible to assemble the rotor in a simple and relatively inexpensive manner by the use of the standard tools and manufacturing methods which are used for the production of conventional squirrel-cage rotors. The die-cast cage structure rigidly holds the magnets and pole shoes in place and a solid, rugged construction results with no parts which can loosen in service. Since no special tools or manufacturing methods are required, the rotor can be easily and inexpensively produced and the necessity of individually assembling a large number of separate parts is eliminated. The cage structure serves a dual purpose since it not only holds the parts of the assembly in place, but also serves as a damper winding, so that a very effective, but simple and inexpensive structure is provided.

It will be understood that although a specific embodiment of the invention has been shown and described for the purpose of illustration, various modifications may be made within the scope of the invention, and the invention is not restricted to the specific details shown, but includes all equivalent embodiments and modifications.

I claim as my invention:

1. A rotor member for a dynamo-electric machine comprising a rotatable support member, a plurality of permanent magnets disposed radially about said support member, the support member having undercut shoulders adjacent each end of the magnets, solid imperforate pole shoes on the magnets, said pole shoes having side portions overlapping the magnets, the pole shoes and magnets each having grooves extending longitudinally thereof and having grooves extending transversely across their ends, and a continuous mass of metal filling the longitudinal spaces between the magnets and extending circumferentially at both ends of the magnets to form a short-circuited winding, said metal engaging in said grooves and said shoulders to hold the magnets and pole shoes rigidly in place.

2. A rotor member for a dynamo-electric machine comprising a rotatable support member, a plurality of permanent magnets disposed radially about said support member, the support member having undercut shoulders adjacent each end of the magnets, solid imperforate pole shoes on the magnets, said pole shoes having side portions overlapping the magnets, the pole shoes and magnets each having grooves extending longitudinally thereof and having grooves extending transversely across their ends, and a continuous metal cage structure having longitudinal portions substantially filling the spaces between the magnets and engaging in the longitudinal grooves of the magnets and pole shoes and having circumferential end portions at each end of the rotor integral with the longitudinal portions and engaging in the transverse grooves of the magnets and pole shoes and in said shoulders, the cage structure rigidly retaining the magnets and pole shoes in place and forming a short-circuited winding.

References Cited in the file of this patent

UNITED STATES PATENTS

| 2,475,776 | Brainard | July 12, 1949 |
| 2,488,437 | Schaefer | Nov. 15, 1949 |
| 2,488,729 | Kooyman | Nov. 22, 1949 |
| 2,626,367 | Beymer | Jan. 20, 1953 |

FOREIGN PATENTS

| 419,119 | Italy | Mar. 13, 1947 |
| 604,762 | Great Britain | July 9, 1948 |